United States Patent [19]

Leonhardt

[11] 4,202,243

[45] May 13, 1980

[54] SELF-COMPENSATING RIVET

[75] Inventor: Robert F. Leonhardt, Roscoe, Ill.

[73] Assignee: Atwood Vacuum Machine Company, Rockford, Ill.

[21] Appl. No.: 929,215

[22] Filed: Jul. 31, 1978

[51] Int. Cl.² .................. F16B 5/04; F16B 19/06
[52] U.S. Cl. .................. 85/37; 29/522 A; 403/153
[58] Field of Search .......... 85/37, 9 R; 29/509, 29/522 A; 403/161, 153

[56] References Cited

U.S. PATENT DOCUMENTS

| | | | |
|---|---|---|---|
| 924,398 | 6/1909 | Stevens | 85/37 X |
| 2,482,391 | 9/1949 | Webster | 85/37 |
| 3,357,084 | 12/1967 | Colautti et al. | 85/37 X |
| 3,505,923 | 4/1970 | Neill | 85/37 |
| 3,921,777 | 11/1975 | Rist | 85/37 X |

FOREIGN PATENT DOCUMENTS 1186760  4/1970  United Kingdom ............ 85/37

Primary Examiner—Ramon S. Britts
Attorney, Agent, or Firm—Leydig, Voit, Osann, Mayer & Holt, Ltd.

[57] ABSTRACT

A rivet for pivotally securing a link to a bracket and adapted to compensate for tolerance variations in the thickness of the link and the bracket. A substantially hemispherical recess is formed in the shank end of the rivet while a counter-recess defined by a substantially hemispherical recess and by a frustoconical recess is formed in the head of the rivet.

10 Claims, 4 Drawing Figures

SELF-COMPENSATING RIVET

BACKGROUND OF THE INVENTION

This invention relates to a self-compensating rivet of the type which may be used, for example, for staking a hinged member to a fixed member. A self-compensating rivet is dislosed in Neill U.S. Pat. No. 3,505,923.

As explained in the Neill patent, the permissible dimensional tolerances in the thickness of the members being hinged together can result in the hinge action being either too tight or too loose. To compensate for variations in thickness, the Neill patent discloses a rivet whose head includes a portion which deflects axially during staking if the thickness of one of the members is less than the maximum permissible thickness. Such deformation forces the members together to effect the desired tightness in the hinge.

SUMMARY OF THE INVENTION

The general aim of the present invention is to provide a new and improved self-compensating rivet which can be staked with a flat punch as well as with a flat anvil, which does not swell in the hole in the hinged member during staking, which applies spring pressure to the hinged member and which possesses higher push out resistance than prior self-compensating rivets.

A more detailed object is to achieve the foregoing through the provision of a rivet having uniquely shaped and uniquely located recesses in its head and having a uniquely shaped recess in the end of its shank.

These and other objects and advantages of the invention will become more apparent from the following detailed description when taken in conjunction with the accompanying drawings.

DETAILED DESCRIPTION OF THE PREFERRED EMBODIMENT

Figure 1:
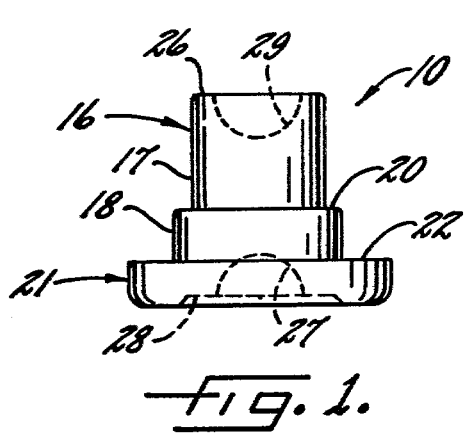
FIG. 1 is a side elevational view of a new and improved self-compensating rivet incorporating the unique features of the present invention.
Figure 2:
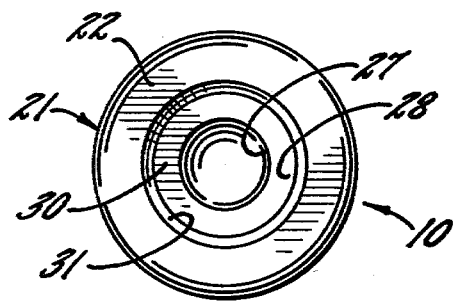
FIG. 2 is a bottom plan view of the rivet shown in FIG. 1.

As shown in the drawings for purposes of illustration, the invention is embodied in a rivet 10 for pivotally securing a hinged member 11 to a fixed member 12. The hinged member may, for example, be a link which forms part of a vehicle hood hinge. The fixed member may be the mounting bracket for the hinge. A hole 14 for receiving the rivet 10 is formed through the link 11 while a somewhat smaller rivet-receiving hole 15 is formed through the bracket 12.

The rivet 10 includes a shank 16 of circular cross-section and having integral and coaxial first and second portions 17 and 18. The first portion 17 of the shank is considerably longer than the second portion 18 but is smaller in diameter than the second portion and thus an annular shoulder 20 is formed at the junction of the first and second portions. A coaxial head 21 is formed integrally with the second shank portion 18 and is considerably larger in diameter than the second portion. As a result, the upper side of the head defines a flange or shoulder 22 (FIG. 3) which extends radially from the second shank portion.

Figure 3:
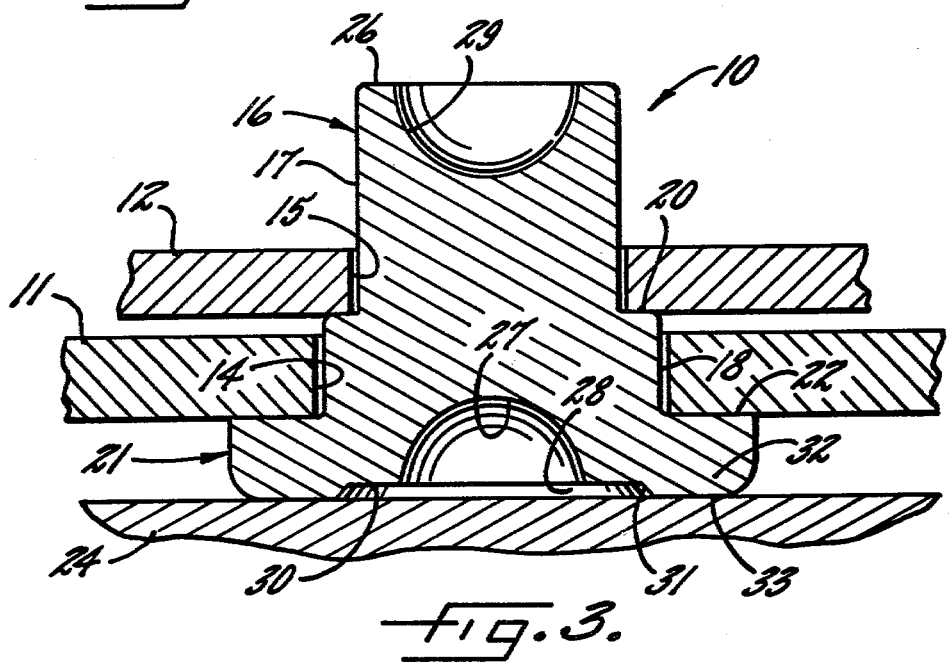
FIG. 3 is an enlarged cross-section of the rivet and shows the rivet in conjunction with the members to be riveted and prior to staking of the rivet.
Figure 4:
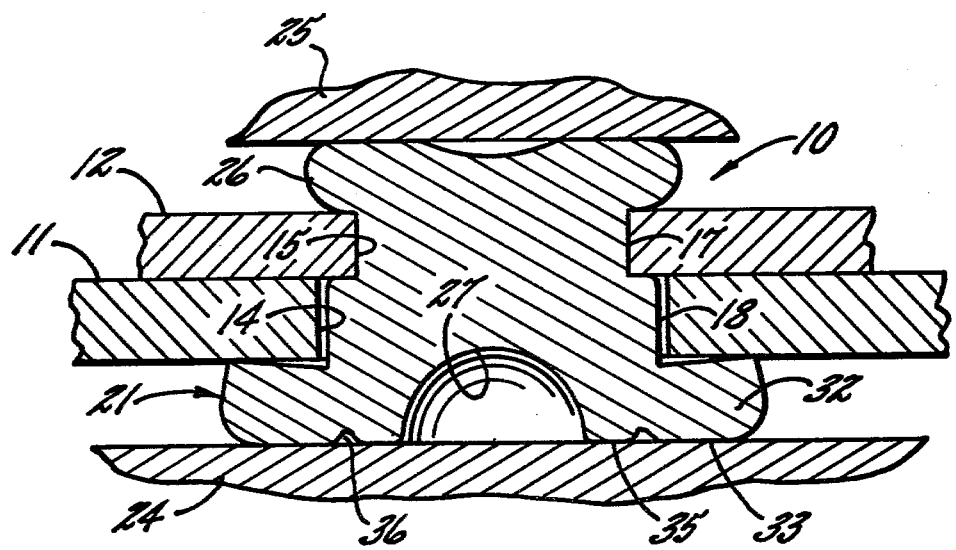
FIG. 4 is a view similar to FIG. 3 but shows the rivet after the latter has been staked.

As shown in FIG. 3, the rivet 10 is inserted into the link 11 and the bracket 12 with the first shank portion 17 extending through the hole 15 in the bracket and with the second shank portion 18 extending through the hole 14 in the link. The bracket rests on the shoulder 20 while the link rests on the shoulder 22 defined by the upper side of the head 21. Located below the head is a fixed anvil 24 having a flat surface which engages the lower side of the head 21 and which coacts with a punch 25 (FIG. 4) to effect staking of the rivet when the punch is shifted downwardly against the free end 26 of the first shank portion 17. When the rivet 10 is staked, the punch swages a portion of the shank 16 outwardly and downwardly against the bracket 12 as shown in FIG. 4 and causes a flange 26 to form around the upper end of the rivet.

Because of the wide range of tolerances permissible in high speed, mass production manufacture of the link 11 and the bracket 12, the thickness of different ones of these elements may vary widely. In order to establish a pivotal connection which is neither too loose nor too tight, it is necessary that the rivet 10 compensate for the variations in material thickness and secure the link and the bracket in such a manner as to produce proper frictional engagement between the two.

The present invention contemplates the provision of a new and improved self-compensating rivet 10 which is characterized by uniquely shaped recesses 27, 28 and 29 (FIG. 3) that cause the rivet to clamp the link 11 and the bracket 12 together with zero axial clearance but with a spring action so as to establish the desired frictional contact in spite of variations in the thickness of the link and the bracket. Moreover, the recesses enable a desired amount of radial clearance to be established between the second shank portion 18 and the hole 14 in the link 11, enable the staked rivet to possess comparatively high push out resistance and enable the rivet to be staked both with a flat anvil 24 and with a flat punch 25.

More specifically, the recesses 27 and 28 are formed in the head 21 of the rivet 10 and together define a counter-recess. The inner recess 27 preferably is substantially hemispherical in shape and in coaxial with the head. The recess 27 is relatively deep and, in this instance, its bottom is disposed in substantially the same radial plane as the shoulder 22 defined by the upper side of the head.

The outer recess 28 is considerably shallower and is of considerably larger diameter than the inner recess 27. Preferably, the recess 28 is shaped as a frustum and thus includes a flat and radially extending bottom 30 (FIG. 3) and an inclined side wall 31, the latter flaring radially outwardly upon progressing axially outwardly or downwardly. In the preferred embodiment, the major diameter of the recess 28 is no greater than the diameter of the second shank portion 18 and preferably is less than the diameter of such shank portion. The minor diameter of the recess 28 is greater than the diameter of the first shank portion 17.

By virtue of the recesses 27 and 28, the head 21 of the rivet 10 is left with an annulus 32 which is adapted to engage the anvil 24. In keeping with the invention, the anvil-engaging surface 33 of the annulus 32 of the unstaked rivet is flat or planar and thus such surface lies in a radial plane and in flat face-to-face relationship with the anvil 24 as shown in FIG. 3. The inner diameter of the surface 33 coincides with the major diameter of the recess 28 and thus such inner diameter is no greater than and preferably is less than the diameter of the second shank portion 18.

The recess 29 is formed in the free end 26 of the first shank portion 17 and, like the recess 27, is substantially hemispherical in shape. The recess 29 is formed on the same radius as the recess 27, is centered with respect to the axis of the rivet 10 and opens upwardly out of the free end 26 thereof.

To fasten the link 11 to the bracket 12, the rivet 10 is placed in an upright position with its anvil-engaging surface 33 resting on the anvil 24 as shown in FIG. 3, the link is placed on the shoulder 22, and the bracket is placed on the shoulder 20. In keeping with the invention, the length of the second shank portion 18 is greater than the maximum permissible thickness of the link. Accordingly, axial clearance always exists between the link 11 and the bracket 12 prior to staking of the rivet (see FIG. 3).

Staking of the rivet 10 is effected by shifting the punch 25 downwardly into engagement with the free end 26 of the shank portion 17. As the flat surface of the punch engages the rivet, the hemispherical recess 29 permits the metal surrounding the recess to flow radially outwardly in a uniform manner as the metal is deformed axially. Accordingly, the flange 26 (FIG. 4) is formed on the free end portion of the rivet and moves downwardly into engagement with the upper side of the bracket 12. At the same time, that section of the first shank portion 17 that is located in the hole 15 enlarges or swells radially and takes up all of the clearance in the hole.

As the punch 25 continues downwardly, the bracket 12 is pressed against the shoulder 20 by the flange 26 and causes the second shank portion 18 to deform axially. Such axial deformation is permitted by virtue of the presence of the recesses 27 and 28. As shown in FIG. 3, the recess 30 underlies the second shank portion 18 and thus such shank portion initially is unsupported by the anvil 24. As a result, the second shank portion 18 is free to deform axially when subjected to an axial force. Because of such freedom, the second shank portion 18 does not deform or swell in a radial direction to any appreciable degree and thus radial clearance is maintained between the second shank portion and the hole 18 so as to leave the link 11 free to pivot on the second shank portion (see FIG. 4).

As the second shank portion 18 deforms axially, it pushes the metal at the bottom 30 of the recess 28 downwardly into engagement with the anvil 24 as shown in FIG. 4 and causes such metal to form a ring 35 around the recess 27. The ring 35 which is thus formed performs two important functions. First, it serves as the bottom of a rigid column which extends upwardly through the second shank portion 18 and part of the first shank portion 17 and which helps promote controlled and uniform collapse of the metal around the free end 26 of the rivet 10 during formation of the flange 26. Secondly, the ring 35 serves as a fulcrum to permit the annulus 32 to pivot upwardly as shown in FIG. 4 and press the link 11 against the bracket 12 with a spring action. The annulus 32 pivots upwardly to the degree necessary to compensate for variations in the thickness of the link 11 and the bracket 12 and to take up all axial clearance between the two. Good frictional contact thus is established between the link and the bracket but, at the same time, excessive tightness is avoided because of the spring action and because the metal at the inner margin of the ring 35 is free to flow inwardly into the recess 27 and relieve the force with which the annulus 32 presses against the link 11. In the finally staked rivet, an annular groove 36 (FIG. 4) is left between the annulus 32 and the ring 35 as a result of the annulus hinging upwardly and as a result of the second shank portion 18 being deformed axially.

From the foregoing, it will be apparent that the present invention brings to the art a new and improved self-compensating rivet 10 in which the recesses 27, 28 and 29 coact to effect uniform axial and radial flow of the metal at the free end of the rivet so as to produce a uniform flange 26 which enables the rivet to possess high push-out resistance. The recesses 27 and 28 also permit the second shank portion 18 to deform axially without deforming radially and, as a result, the axial clearance between the link 11 and the bracket 12 is taken up while still leaving radial clearance between the link and the second shank portion. In addition, the recesses 27 and 28 permit the annulus 32 to hinge upwardly to press the link 11 against the bracket 12 with a spring action which is appropriate to compensate for variations in the thickness of the link and bracket.

Because of the hemispherical recess 29, a flat punch 25 can be used to stake the rivet 10 and thus the need of precisely locating the punch relative to the axis of the rivet is avoided. Also, the rivet permits a stop block to be used between the punch 25 and the anvil 24 in order to determine the stake height of the rivet.

I claim:

1. A self-compensating rivet in unstaked form and comprising first and second integral and coaxial shank portions and further comprising an integral and coaxial head said second shank portion being located between said first shank portion and said head and having a predetermined diameter greater than the diameter of said first shank portion and less than the diameter of said head, said head having a substantially flat annulus disposed in a radial plane and defining an anvil-engaging surface, the inner diameter of said flat annulus being no greater than the diameter of said second shank portion, the outer diameter of said flat annulus being greater than the diameter of said second shank portion, a counter-recess centered within said annulus and defined by inner and outer recesses, said outer recess having a diameter greater than the diameter of said inner recess and defining the inner diameter of said flat annulus.

2. A self-compensating rivet as defined in claim 1 in which the inner diameter of said annulus and the diameter of said outer recess is less than the diameter of said second shank portion.

3. A self-compensating rivet as defined in claim 1 in which said inner recess is substantially hemispherical in shape.

4. A self-compensating rivet as defined in claims 1, 2 or 3 in which said outer recess is substantially frustoconical in shape, the side wall of said outer recess flaring outwardly upon progressing outwardly, the bottom wall of said outer recess being disposed in a radial plane.

5. A self-compensating rivet as defined in claims 1, 2 or 3 in which the depth of said inner recess is substantially greater than the depth of said outer recess.

6. A self-compensating rivet as defined in claims 1, 2 or 3 in which a substantially hemispherical recess is formed in said first shank portion and opens out of the free end thereof.

7. A self-compensating rivet in unstaked form and comprising first and second integral and coaxial shank portions and further comprising an integral and coaxial head, said second shank portion being located between said first shank portion and said head and having a predetermined diameter greater than the diameter of said first shank portion and less than the diameter of said head, said head having a substantially flat annulus disposed in a radial plane and defining an anvil-engaging surface, the inner diameter of said flat annulus being no greater than the diameter of said second shank portion, the outer diameter of said flat annulus being greater than the diameter of said second shank portion, a counter-recess centered within said annulus and defined by inner and outer recesses, said outer recess having a diameter greater than the diameter of said inner recess and defining the inner diameter of said flat annulus, said inner recess being substantially hemispherical in shape and having a depth substantially greater than the depth of said outer recess, and a substantially hemispherical recess formed in said first shank portion and opening out of the free end thereof.

8. A self-compensating rivet as defined in claim 7 in which said outer recess is substantially frustoconical in shape, the side wall of said outer recess flaring outwardly upon progressing outwardly, the bottom wall of said outer recess being disposed in a radial plane.

9. A self-compensating rivet as defined in claim 8 in which the diameter of said inner recess is substantially the same as the diameter of the recess in said first shank portion.

10. A self-compensating rivet as defined in claims 8 or 9 in which the inner diameter of said annulus and the diameter of said outer recess is less than the diameter of said second shank portion.

* * * * *